United States Patent [19]
Kaiser et al.

[11] 3,879,557

[45] Apr. 22, 1975

[54] COMPOSITIONS FOR PRODUCING β-ADRENERGIC STIMULANT WITH 4-HYDROXY-3-HYDROXYMETHYLPHENYL-2-PIPERIDINYLCARBINOLS

[75] Inventors: Carl Kaiser, Haddon Heights, N.J.; Stephen T. Ross, Berwyn, Pa.

[73] Assignee: SmithKline Corporation, Philadelphia, Pa.

[22] Filed: Dec. 3, 1973

[21] Appl. No.: 421,465

Related U.S. Application Data

[60] Continuation-in-part of Ser. No. 216,253, Jan. 7, 1972, abandoned, which is a division of Ser. No. 91,222, Nov. 19, 1970, Pat. No. 3,655,676, abandoned.

[52] U.S. Cl. .................................. 424/267
[51] Int. Cl. ............................. A61k 27/00
[58] Field of Search ........................ 424/267

[56] References Cited
UNITED STATES PATENTS
2,976,291  3/1961  Jacob et al. .................. 424/267

*Primary Examiner*—Albert T. Meyers
*Assistant Examiner*—Daren M. Stephens
*Attorney, Agent, or Firm*—Joseph A. Marlino; Richard D. Foggio; William H. Edgerton

[57] ABSTRACT

4-hydroxy-3-hydroxymethylphenyl-2-piperidinylcarbinols prepared by the condensation of an appropriately substituted ether derivative of a methylbenzaldehyde with 2-pyridyl lithium followed by oxidation of the methyl group, removal of the ether group, and reduction of the carboxy pyridine have β-adrenergic stimulant activity. Erythro and threo diastereoisomers may be conveniently separated.

2 Claims, No Drawings

COMPOSITIONS FOR PRODUCING β-ADRENERGIC STIMULANT WITH 4-HYDROXY-3-HYDROXYMETHYLPHENYL-2-PIPERIDINYLCARBINOLS

This is a continuation-in-part of copending application Ser. No. 216,253 filed Jan. 7, 1972 now abandoned, which is a division of application SEr. No. 91,222 filed Nov. 19, 1970, which has issued into U.S. Pat. No. 3,655,676.

This invention relates to 4-hydroxy-3-hydroxymethylphenyl-2-piperidinylcarbinols which have useful pharmacodynamic activity. More specifically the compounds of this invention have utility as β-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

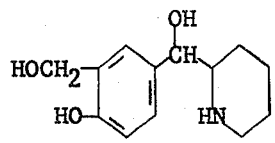

FORMULA I

The compounds of this invention may be present as diastereoisomers and are designated as erythro- and threo-isomers which may be resolved as d, l optical isomers. Unless otherwise specified in the description and accompanying claims, it is intended to include all isomers, whether separated or mixtures thereof.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic methanesulfonic, ethanedisulfonic, acetic, oxalic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

A preferred compound of this invention is erythro-4-hydroxy-3-hydroxymethylphenyl-2-piperidinylcarbinol which relaxes the spontaneous tone of guinea pig tracheal ring preparation at an $ED_{50}$ of 0.125 mcg./ml. while increasing the rate of contraction of guinea pig right atria at an $ED_{25}$ of 13.4 mcg./ml. These activities give an absolute separation ratio of 107 which is 214 fold improvement when compared to the corresponding activity of d,l isoproterenol (absolute separation = 0.5) in similar in vitro preparations.

The compounds of this invention are prepared from a sequence of reactions illustrated by the following preparation of 4-hydroxy-3-hydroxymethylphenyl-2-piperidinylcarbinol:

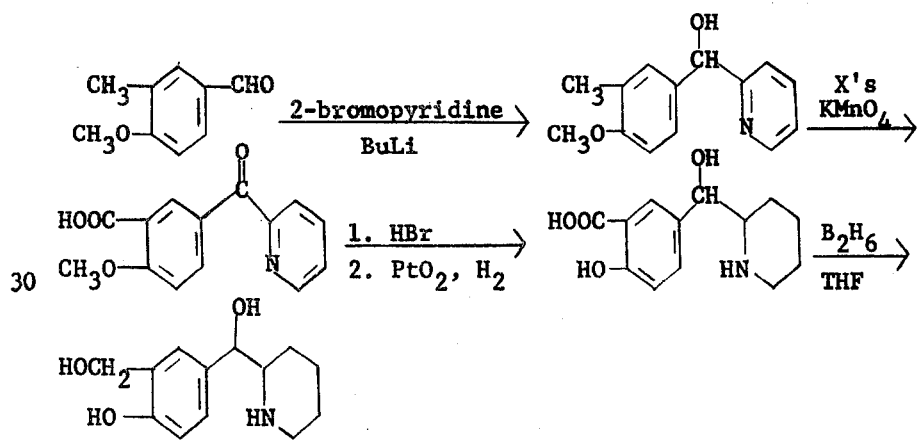

Thus, as shown above, a lower alkyl ether derivative of an appropriately substituted methylbenzaldehyde is condensed with a 2-halopyridine, preferably bromo, in the presence of an organometal derivative, preferably butyl lithium, and in an organic nonreactive solvent such as tetrahydrofuran or ether to give a substituted phenyl 2-pyridylcarbinol. The latter is oxidized for example with excess potassium permanganate to yield 3-carboxy-4-methoxyphenyl-2-pyridyl ketone. The ketone is demethylated with 48% hydrobromic acid and then reduced with for example platinum oxide and hydrogen to give the 3-carboxy-4-hydroxyphenyl-2-piperidinylcarbinol. This results in a mixture of erythro-threo isomers present in about a 4:1 ratio. The acid is then reduced to the desired hydroxymethylphenyl derivative by reacting it with a suitable reducing agent such as borane in a nonreactive organic solvent.

Alternatively a benzyl ether derivative of an appropriately substituted hydroxybenzaldehyde is condensed as above with a 2-halopyridine to give a substituted phenyl-2-pyridylcarbinol. Following oxidation of the methyl group, the ketone is reduced with platinum oxide and hydrogen to give the corresponding 2-piperidinylcarbinol which is debenzylated with palladium-on-carbon and hydrogen to yield the hydroxyphenyl-2-piperidinylcarbinol.

A further modification of the preparation of the compounds of this invention is the condensation of the Grignard reagent derived from a methyl ether derivative of an appropriately substituted hydroxy halobenzene, preferably bromobenzene, with 2-cyanopyridine. The resulting ketone is oxidized, demethylated, and reduced as described above to give the product.

If desired the erythro and threo diastereoisomers of the compounds of formula I may be separated, for example, by fractional crystallization of the product, preferably as an acid addition salt.

The compounds of this invention may be administered orally or parenterally in conventional dosage unit forms such as tablets, capsules, injectables or the like, by incorporating the appropriate dose of a compound of formula I, with carriers according to accepted pharmaceutical practices. Preferably a compound or an acid addition salt thereof is administered orally to an animal organism in a tablet or capsule comprising an amount sufficient to produce $\beta$-adrenergic stimulant activity. Each dosage unit will contain the active medicament in an amount of about 25 mg. to about 50 mg. Advantageously equal doses will be administered 3 to 4 times daily with the daily dosage regimen being about 75 mg. to about 200 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension. Of particular applicability for intranasal administration is an aerosol dispensing system wherein the active medicament is incorporated with Freon or other inert propellant in an aerosol container. Such an aerosol system will deliver a metered dose of about 250 mcg. to about 500 mcg., administered once or twice at a time as needed. Also useful for this purpose is a liquid formulation in a plastic squeeze bottle.

The foregoing is a general description of how to prepare the compounds of this invention. The following example illustrates the preparation of specific compounds having $\beta$-adrenergic stimulant activity and should not be construed as a limitation of the invention.

EXAMPLE

A stirred solution of 187.5 ml. of 1.6 M solution of butyl lithium in hexane is cooled to $-40°$ C. under nitrogen and 39.5 g. (0.25 m.) of 2-bromopyridine in 100 ml. of ether is added dropwise. The mixture is stirred 15 minutes at $-40°$ C. and a solution of 41.5 g. (0.25 m.) of 3-methyl-4-methoxybenzaldehyde in 200 ml. of ether is added. After stirring at $-15°$ C. for 45 minutes, the mixture is poured into 500 g. ice/100 ml. concentrated hydrochloric acid. The separated aqueous layer is made alkaline with concentrated ammonium hydroxide, extracted with ether and the dried extract concentrated. The residual oil is crystallized to give 3-methyl-4-methoxyphenyl-2-pyridylcarbinol.

A stirred suspension of 30.0 g. (0.131 m.) of the above carbinol in 250 ml. of water is heated to 70° C. and 72.0 g. (0.45 m.) of potassium permanganate is added in portions. The mixture is stirred and heated on a steam bath for 30 minutes and an additional 12.0 g. (0.08 m.) of potassium permanganate is added. The mixture is heated at 90° C. for 30 minutes more and then filtered through super-Cel. The filtrate is concentrated in vacuo to approximately 60 ml. and acidified with acetic acid to yield 3-carboxy-4-methoxyphenyl-2-pyridyl ketone with an m.p. of > 250° C.

A solution of 49.0 g. of the above ketone in 500 ml. of 48% hydrobromic acid is refluxed for 2 hours and then concentrated in vacuo. The residue is dissolved in ethanol, toluene is added, the solution concentrated and the residue stripped with toluene to yield 3-carboxy-4-hydroxyphenyl-2-pyridyl ketone hydrobromide.

A mixture of 3.0 g. of platinum oxide and a solution of 12.0 g. of 3-carboxy-4-hydroxyphenyl-2-pyridyl ketone hydrobromide in 200 ml. of methane is hydrogenated on the Parr apparatus using an initial hydrogen pressure of 50 p.s.i. at room temperature. The reaction mixture is filtered, the filtrate concentrated in vacuo and the residue triturated with acetone and filtered to give erythro-3-carboxy-4-hydroxyphenyl-2-piperidinylcarbinol hydrobromide, m.p. 219° C. (decomp.). The acetone filtrate is concentrated to yield threo-3-carboxy-4-hydroxyphenyl-2-piperidylcarbinol.

Treatment of the above hydrobromide with aqueous sodium bicarbonate yields the free base of the carbinol, m.p. 250° C. 0.91 g. (.0036 m.) of the erythro amino acid is added to an ice cold solution of 40 cc. of 1 M borane in tetrahydrofuron (0.04 M) while stirring under nitrogen. The temperature is kept at 0° C. for 20 hours. The solution is then refluxed 1 hour under nitrogen and concentrated in vacuo. Three portions of methyl alcohol are added, the solution is concentrated and the residue is dissolved in ethanol and filtered. Sulfuric acid is added to a pH of 2.0 and the filtered product is recyrstallized from ethanol-water yielding erythro-4-hydroxy-3-hydroxymethylphenyl-2-piperidinylcarbinol sulfate as white crystals having a melting point of > 400° C.

The threo-3-carboxy-4-hydroxyphenyl-2-piperidinylcarbinol is reduced with borane in the same fashion to yield threo-4-hydroxy-3-hydroxymethylphenyl-2-piperidinylcarbinol.

What is claimed is:

1. A pharmaceutical composition having $\beta$-adrenergic stimulant activity in dosage unit form comprising a pharmaceutical carrier and from about 250 mcg. to about 50 mg. of a chemical compound of the formula:

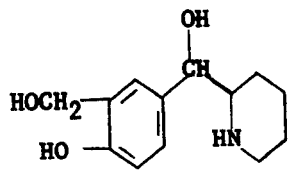

or a pharmaceutically acceptable acid addition salt of said compound.

2. The method of producing β-adrenergic stimulant activity which comprises administering internally to animals requiring bronchodilation an amount sufficient to produce said activity of a chemical compound of the formula:

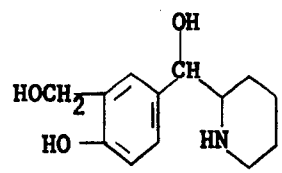

or a pharmaceutically acceptable acid addition salt of said compound.

* * * * *

UNITED STATES PATENT AND TRADEMARK OFFICE
CERTIFICATE OF CORRECTION

PATENT NO. : 3,879,557
DATED : April 22, 1975
INVENTOR(S) : Carl Kaiser and Stephen T. Ross It is certified that error appears in the above-identified patent and that said Letters Patent are hereby corrected as shown below:

The word "ACTIVITY" is missing from the title.

Title should read:

"COMPOSITIONS FOR PRODUCING β-ADRENERGIC STIMULANT ACTIVITY WITH 4-HYDROXY-3-HYDROXYMETHYLPHENYL-2-PIPERIDINYLCARBINOLS"

Signed and sealed this 15th day of July 1975.

(SEAL)
Attest:

RUTH C. MASON
Attesting Officer

C. MARSHALL DANN
Commissioner of Patents
and Trademarks